(12) United States Patent
Deogun et al.

(10) Patent No.: US 11,497,054 B2
(45) Date of Patent: Nov. 8, 2022

(54) CHANNEL CONGESTION MEASUREMENT

(71) Applicant: QUALCOMM Incorporated, San Diego, CA (US)

(72) Inventors: Pravjyot Singh Deogun, Bengaluru (IN); Kapil Bhattad, Bangalore (IN); Ozcan Ozturk, San Diego, CA (US); Xiaoxia Zhang, San Diego, CA (US); Jing Sun, San Diego, CA (US); Ananta Narayanan Thyagarajan, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/793,853

(22) Filed: Feb. 18, 2020

(65) Prior Publication Data

US 2020/0351940 A1    Nov. 5, 2020

(30) Foreign Application Priority Data

May 2, 2019   (IN) .............................. 201941017594

(51) Int. Cl.
*H04W 74/08* (2009.01)
*H04W 16/14* (2009.01)
(Continued)

(52) U.S. Cl.
CPC ....... *H04W 74/0808* (2013.01); *H04W 16/14* (2013.01); *H04W 24/10* (2013.01)

(58) Field of Classification Search
None
See application file for complete search history.

(56) References Cited

U.S. PATENT DOCUMENTS

2017/0196020 A1*   7/2017   Mukherjee .......... H04W 74/004
2017/0231005 A1*   8/2017   Babaei ................. H04L 5/0007
(Continued)

OTHER PUBLICATIONS

Huawei, et al., "Email Discussion Report on [105#49][NR] LBT Impacts in MAC", 3GPP Draft, 3GPP TSG RAN WG2 Meeting #105bis, R2-1904114 Report of the Email Discussion [105#49] LBT Modeling for MAC, 3rd Generation Partnership Project (3GPP), Mobile Competence Centre, 650, Route Des Lucioles, F-06921 Sophia-Anti, vol. RAN WG2, No. Xi'an, China, Apr. 8, 2019-Apr. 12, 2019, Apr. 6, 2019 (Apr. 6, 2019), XP051701428, pp. 1-55, Retrieved from the Internet: URL: http://www.3gpp.org/ftp/Meetings%5F3GPP%5FSYNC/RAN2/Docs/R2%2D1904114%2Ezip, [retrieved on Apr. 6, 2019], 2.1 UL LBT failure and system failure, 2.1.2 Counter for systematic LBT failure, 2.1.5 Handling of UL LBT, 2.1.6 Open-ended question, 2.6 Data inactivity timer Proposal 1.

(Continued)

*Primary Examiner* — Ajit Patel
*Assistant Examiner* — Liem H. Nguyen
(74) *Attorney, Agent, or Firm* — Harrity & Harrity, LLP\Qualcomm

(57) ABSTRACT

This disclosure provides systems, methods and apparatuses for listen-before-talk (LBT) failure-based channel congestion measurement and recovery triggering. In one aspect, a user equipment (UE) may determine an LBT metric based on a result of attempting to perform an uplink transmission in connection with an LBT procedure. For example, the UE may determine an absolute quantity of LBT failures, a ratio of unsuccessful uplink transmissions to total uplink transmission attempts, an absolute quantity of LBT successes, or another type of LBT metric. The UE may trigger a recovery action, such as a radio link failure (RLF) recovery action or a bandwidth part switch, based on determining that the LBT metric satisfies a threshold.

30 Claims, 9 Drawing Sheets

(51) Int. Cl.
*H04W 24/10* (2009.01)
*H04W 72/08* (2009.01)
*H04W 74/00* (2009.01)
*H04W 76/18* (2018.01)

(56) References Cited

U.S. PATENT DOCUMENTS

| | | | | |
|---|---|---|---|---|
| 2018/0124612 | A1* | 5/2018 | Babaei | H04W 16/14 |
| 2018/0124831 | A1* | 5/2018 | Dinan | H04L 41/0813 |
| 2018/0152954 | A1* | 5/2018 | Golitschek Edler Von Elbwart | H04L 5/0092 |
| 2018/0176961 | A1* | 6/2018 | Babaei | H04W 74/0833 |
| 2018/0184362 | A1* | 6/2018 | Babaei | H04W 48/12 |
| 2018/0220457 | A1* | 8/2018 | Koorapaty | H04W 74/0808 |
| 2018/0242357 | A1* | 8/2018 | Khirallah | H04L 5/0053 |
| 2019/0098661 | A1 | 3/2019 | Ye et al. | |
| 2019/0215864 | A1* | 7/2019 | Yang | H04W 80/02 |
| 2019/0253200 | A1* | 8/2019 | Salem | H04W 74/0816 |
| 2019/0313450 | A1* | 10/2019 | Mukherjee | H04W 56/0045 |
| 2020/0146063 | A1* | 5/2020 | Xu | H04B 17/318 |
| 2020/0154480 | A1* | 5/2020 | Jose | H04W 72/02 |
| 2020/0221495 | A1* | 7/2020 | Chen | H04W 36/305 |
| 2020/0229022 | A1* | 7/2020 | Vargantwar | H04W 28/0268 |
| 2020/0236729 | A1* | 7/2020 | Ahn | H04L 5/0048 |
| 2020/0296635 | A1* | 9/2020 | Rastegardoost | H04W 36/0077 |
| 2020/0296772 | A1* | 9/2020 | Babaei | H04W 74/0833 |
| 2020/0314903 | A1* | 10/2020 | Jang | H04W 74/0833 |
| 2020/0314917 | A1* | 10/2020 | Jeon | H04W 74/0833 |
| 2021/0007101 | A1* | 1/2021 | Tooher | H04W 24/02 |
| 2021/0168862 | A1* | 6/2021 | Murray | H04W 74/002 |
| 2021/0235492 | A1* | 7/2021 | Iyer | H04W 72/14 |
| 2021/0345405 | A1* | 11/2021 | Kim | H04W 74/0816 |
| 2022/0021476 | A1* | 1/2022 | Mo | H04W 24/10 |

OTHER PUBLICATIONS

International Search Report and Written Opinion—PCT/US2020/022643—ISAEPO—dated Jun. 2, 2020.
Nokia, et al., "UL LBT Failure Handling", 3GPP Draft, 3GPP TSG-RAN WG2 Meeting #105bis, R2-1903714 UL LBT Failure Handling, 3rd Generation Partnership Project (3GPP), Mobile Competence Centre, 650, Route Des Lucioles, F-06921 Sophia-Antipolis Cedex, France, vol. RAN WG2, No. Xian. China, Apr. 8, 2019-Apr. 12, 2019, Apr. 6, 2019 (Apr. 6, 2019), XP051701055, 2 Pages, Retrieved from the Internet: URL: http://www.3gpp.org/ftp/Meetings%5F3GPP%5FSYNC/RAN2/Docs/R2%2D1903714%2Ezip, [retrieved on Apr. 6, 2019], 2 Discussion, 3 Conclusion.
OPPO: "Introduce LBT Failure Counter in MAC layer", 3GPP Draft, 3GPP TSG-RAN WG2 Meeting #105bis, R2-1904306—Introducing LBT Failure Counter In Mac Layer, 3rd Generation Partnership Project (3GPP), Mobile Competence Centre, 650, Route Des Lucioles, F-06921 Sophia-Antipolis Cedex, vol. RAN WG2, No. Xi'an, China, Apr. 6, 2019-Apr. 12, 2019, Apr. 6, 2019 (Apr. 6, 2019), XP051701613, pp. 1-3, Retrieved from the Internet: URL: http://www.3gpp.org/ftp/Meetings%5F3GPP%5FSYNC/RAN2/Docs/R2%2D1904306%2Ezip, [retrieved on Apr. 6, 2019], 2 Discussion Proposal 2 Options 1-3.
Samsung: "UL LBT Problem Detection", 3GPP Draft, 3GPP TSG-RAN WG2 Meeting #105bis, R2-1903261 [NR-U] UL LBT Detection, 3rd Generation Partnership Project (3GPP), Mobile Competence Centre, 650, Route Des Lucioles, F-06921 Sophia-Antipolis Cedex, France, vol. RAN WG2, No. Xi'an, China, Apr. 8, 2019-Apr. 12, 2019, Mar. 29, 2019 (Mar. 29, 2019), XP051692535, 3 Pages, Retrieved from the Internet: URL: http://www.3gpp.org/ftp/tsg%5Fran/WG2%5FRL2/TSGR2%5F105bis/Docs/R2%2D1903261%2Ezip, [retrieved on Mar. 29, 2019], 2.1 Detection of UL LBT problems, 2.2 Actions after detection of UL LBT problems, 3 Conclusions, figures 1.2.
Intel Corporation, et al., "Corrections to NB-IoT Description in TS 36.300", R2-165808, Change Request, 3GPP TSG-RAN WG2 Meeting #95, Gothenburg, Sweden, Aug. 22-26, 2016, 36 Pages.
NTT Docomo et al., "New Radio (NR) Access Technology", 3GPP Draft, 3GPP TSG RAN Meeting #77, RP-171783, SR ON NR-WID, Status Report to TSG, 3rd Generation Partnership Project (3GPP), Mobile Competence Centre, 650, Route Des Lucioles, F-06921 Sophia-Antipolis Cedex, France, vol. TSG RAN, No. Sapporo, Japan, Sep. 11, 2017-Sep. 14, 2017, Sep. 6, 2017 (Sep. 6, 2017), XP051668625, 283 Pages, Retrieved from the Internet: URL:http://www.3gpp.org/ftp/tsg%5Fran/TSG%5FRAN/TSGR%5F77/Docs/RP%2D171783%2Ezip [retrieved on Sep. 6, 2017], Section: Scheduling and HARQ Aspects; p. 52-p. 63.

* cited by examiner

CHANNEL CONGESTION MEASUREMENT

CROSS-REFERENCE TO RELATED APPLICATION

This patent application claims priority to Indian Patent Application No. 201941017594, filed on May 2, 2019, entitled "CHANNEL CONGESTION MEASUREMENT," and assigned to the assignee hereof. The disclosure of the prior application is considered part of and is incorporated by reference in this patent application.

TECHNICAL FIELD

Aspects of the present disclosure relate generally to wireless communication and more particularly to techniques for channel congestion measurement.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink (DL) and uplink (UL). The DL (or forward link) refers to the communication link from the BS to the UE, and the UL (or reverse link) refers to the communication link from the UE to the BS. As will be described in more detail herein, a BS may be referred to as a NodeB, an LTE evolved nodeB (eNB), a gNB, an access point (AP), a radio head, a transmit receive point (TRP), a New Radio (NR) BS, or a 5G NodeB.

The above multiple access technologies have been adopted in various telecommunication standards to provide a common protocol that enables different UEs to communicate on a municipal, national, regional, and even global level. NR, which also may be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using OFDM with a cyclic prefix (CP) (CP-OFDM) on the DL, using CP-OFDM or SC-FDM (for example, also known as discrete Fourier transform spread OFDM (DFT-s-OFDM)) on the UL (or a combination thereof), as well as supporting beamforming, multiple-input multiple-output (MIMO) antenna technology, and carrier aggregation.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of wireless communication performed by an apparatus of a user equipment (UE). The method may include performing a set of listen-before-talk (LBT) procedures to access an unlicensed spectrum; determining an LBT metric associated with a result of the set of LBT procedures; and selectively triggering a recovery procedure based on the LBT metric satisfying an LBT metric threshold.

In some aspects, selectively triggering the recovery procedure includes at least one of triggering one or more a radio link failure (RLF) related procedures, performing a recovery action, or reporting the LBT metric to a base station (BS). In some aspects, the LBT metric is an LBT failure metric. In some aspects, determining the LBT metric includes determining that an LBT failure occurs for an LBT procedure of the set of LBT procedures based on a failure to transmit on an uplink transmission instance. In some aspects, the uplink transmission instance is at least one of a physical uplink shared channel (PUSCH) transmission, a physical uplink control channel (PUCCH) transmission, or a physical random access channel (PRACH) transmission, or a sounding reference signal (SRS) transmission.

In some aspects, the LBT metric is incremented for each failure to transmit on an uplink transmission instance. In some aspects, the LBT metric is incremented based on whether at least one failure to transmit on an uplink transmission instance occurs during a threshold period of time. In some aspects, the LBT metric is incremented based on a ratio of uplink transmission failures to uplink attempts during a threshold period of time. In some aspects, the LBT metric is incremented based on a threshold quantity of uplink transmission failures occurring during a threshold period of time. In some aspects, a threshold period of time associated with identifying an LBT failure associated with the LBT metric is ended and the LBT failure is not determined based on a threshold quantity of successful uplink transmissions occurring during the threshold period of time.

In some aspects, the LBT metric is incremented based on whether at least one uplink transmission failure occurs during an evaluation period that includes a uplink transmission. In some aspects, the LBT metric is incremented based on a quantity of uplink transmission failures during the evaluation period. In some aspects, the LBT metric is incremented based on whether a quantity of uplink transmission failures during the evaluation period satisfies an uplink transmission failure threshold. In some aspects, an LBT failure associated with the LBT metric is not determined when a quantity of successful uplink transmissions satisfies an uplink transmission threshold during the evaluation period. In some aspects, the LBT metric is incremented based on an occurrence of a scheduled uplink transmission.

In some aspects, the scheduled uplink transmission includes at least one uplink transmission instance and is at least one of an uplink grant, a PUCCH, or an uplink channel. In some aspects, the LBT metric is incremented based on an uplink transmission failure occurring for each uplink transmission instance of the scheduled uplink transmission. In some aspects, the LBT metric is incremented based on whether an uplink transmission failure occurs in an uplink burst or a channel occupancy time. In some aspects, the LBT metric is incremented based on the uplink transmission failure occurring for each uplink transmission instance of the uplink burst or the channel occupancy time.

In some aspects, the LBT metric is at least one of an absolute metric representing at least one LBT failure in a measurement interval, a ratio metric representing a ratio of LBT failures to occasions during which an LBT failure can occur in the measurement interval, an absolute metric representing a threshold quantity of LBT failures occurring in the measurement interval, or an absolute metric representing a quantity of LBT failures occurring in the measurement interval. In some aspects, the measurement interval is at least one of a set of slots, a set of mini-slots, a set of occasions in a single slot, or a set of uplink grants in a channel occupancy time or uplink burst. In some aspects, the LBT metric is on a per-LBT type basis. In some aspects, the LBT metric includes a first LBT metric for category-4 LBT and a second LBT metric for category-2 LBT.

In some aspects, the first LBT metric and the second LBT metric are weighted equally for determining whether the LBT metric satisfies the LBT metric threshold. In some aspects, selectively triggering the recovery procedure includes triggering the recovery procedure based on the first LBT metric satisfying a first threshold or the second LBT metric satisfying a second threshold. In some aspects, a first weight is applied to the first LBT metric and a second weight is applied to the second LBT metric for determining whether the LBT metric satisfies the LBT metric threshold. In some aspects, at least one of the first weight or the second weight is determined based on at least one of a ratio of busy slots of a corresponding channel to a total quantity of slots of the corresponding channel, an initial LBT counter value, a congestion window size, or a channel access priority class. In some aspects, the LBT metric includes a first LBT metric for outside acquired channel occupancy time (COT) LBT and a second LBT metric for inside acquired COT LBT.

In some aspects, the LBT metric is sub-band-specific or common to a plurality of sub-bands. In some aspects, the LBT metric is determined based on at least one of an LBT failure on one or more sub-bands, an LBT success on one or more sub-bands, or an LBT failure on a single sub-band. In some aspects, the LBT metric relates to a secondary cell, and selectively triggering the recovery procedure includes transmitting a report to indicate that the LBT metric satisfies the LBT metric threshold for the secondary cell. In some aspects, the report includes information identifying at least one of the LBT metric, a measurement report for the secondary cell, a COT metric, or a received signal strength indicator (RSSI) for the secondary cell. In some aspects, the LBT metric is at least one of a metric relating to a quantity of LBT failures, a metric relating to a channel busy state as a result of LBT failure, or a metric relating to an amount of data missed as a result of LBT failure.

In some aspects, the LBT metric relates to a first bandwidth part. In some aspects, selectively triggering the recovery procedure includes performing a bandwidth part switch from the first bandwidth part to a second bandwidth part. In some aspects, the second bandwidth part is different from an initial access bandwidth part or a default bandwidth part. In some aspects, the method may include transmitting, to a serving cell, a reporting message indicating triggering of the bandwidth part switch. In some aspects, the reporting message is at least one of a radio resource control (RRC) message, a medium access control (MAC) message, or a physical layer message. In some aspects, the reporting message includes information identifying at least one of a bandwidth part switch triggering event, or a quantity of LBT failures. In some aspects, the method may include transmitting, to a serving cell, a reporting message after the bandwidth part switch, and the reporting message may be a random access channel (RACH) message.

Another innovative aspect of the subject matter described in this disclosure can be implemented in a UE for wireless communication. The UE may include memory and one or more processors operatively coupled to the memory. The memory and the one or more processors may be configured to perform a set of LBT procedures to access an unlicensed spectrum; determine an LBT metric associated with a result of the set of LBT procedures; and selectively trigger a recovery procedure based on the LBT metric satisfying an LBT metric threshold.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to perform a set of LBT procedures to access an unlicensed spectrum; determine an LBT metric associated with a result of the set of LBT procedures; and selectively trigger a recovery procedure based on the LBT metric satisfying an LBT metric threshold.

Another innovative aspect of the subject matter described in this disclosure can be implemented in an apparatus for wireless communication. The apparatus may include means for performing a set of LBT procedures to access an unlicensed spectrum; means for determining an LBT metric associated with a result of the set of LBT procedures; and means for selectively triggering a recovery procedure based on the LBT metric satisfying an LBT metric threshold.

Another innovative aspect of the subject matter described in this disclosure can be implemented in a method of wireless communication performed by an apparatus of a BS. The method may include configuring, for a UE on a first bandwidth part, a second bandwidth part to enable a bandwidth part switch for the UE and in connection with an LBT metric, where the second bandwidth part is different from an initial access bandwidth part or a default bandwidth part; and receiving a reporting message indicating a trigger of the bandwidth part switch by the UE after the LBT metric satisfies a threshold.

Another innovative aspect of the subject matter described in this disclosure can be implemented in a BS for wireless communication. The BS may include memory and one or more processors operatively coupled to the memory. The memory and the one or more processors may be configured to configure, for a UE on a first bandwidth part, a second bandwidth part to enable a bandwidth part switch for the UE and in connection with an LBT metric, where the second bandwidth part is different from an initial access bandwidth part or a default bandwidth part; and receive a reporting message indicating a trigger of the bandwidth part switch by the UE after the LBT metric satisfies a threshold.

In some aspects, the reporting message is at least one of a RRC message, a MAC message, or a physical layer message. In some aspects, the reporting message includes information identifying at least one of a bandwidth part switch triggering event, or a quantity of LBT failures. In some aspects, the method may include receiving a RACH message after the bandwidth part switch Another innovative aspect of the subject matter described in this disclosure can be implemented in a non-transitory computer-readable medium. The non-transitory computer-readable medium may store one or more instructions for wireless communication. The one or more instructions, when executed by one or more processors of a BS, may cause the one or more processors to configure, for a UE on a first bandwidth part, a second bandwidth part to enable a bandwidth part switch for the UE and in connection with an LBT metric, where the second bandwidth part is different from an initial access bandwidth part or a default bandwidth part; and receive a reporting message indicating a trigger of the bandwidth part switch by the UE after the LBT metric satisfies a threshold.

Another innovative aspect of the subject matter described in this disclosure can be implemented in an apparatus for wireless communication. The apparatus may include means for configuring, for a UE on a first bandwidth part, a second bandwidth part to enable a bandwidth part switch for the UE and in connection with an LBT metric, where the second bandwidth part is different from an initial access bandwidth part or a default bandwidth part; and means for receiving a reporting message indicating a trigger of the bandwidth part switch by the UE after the LBT metric satisfies a threshold.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the Figures is provided for the purposes of illustration and description, and not as a definition of the limits of the claims.

BRIEF DESCRIPTION OF THE DRAWINGS

Like reference numbers and designations in the various drawings indicate like elements.

DETAILED DESCRIPTION

Figure 1:
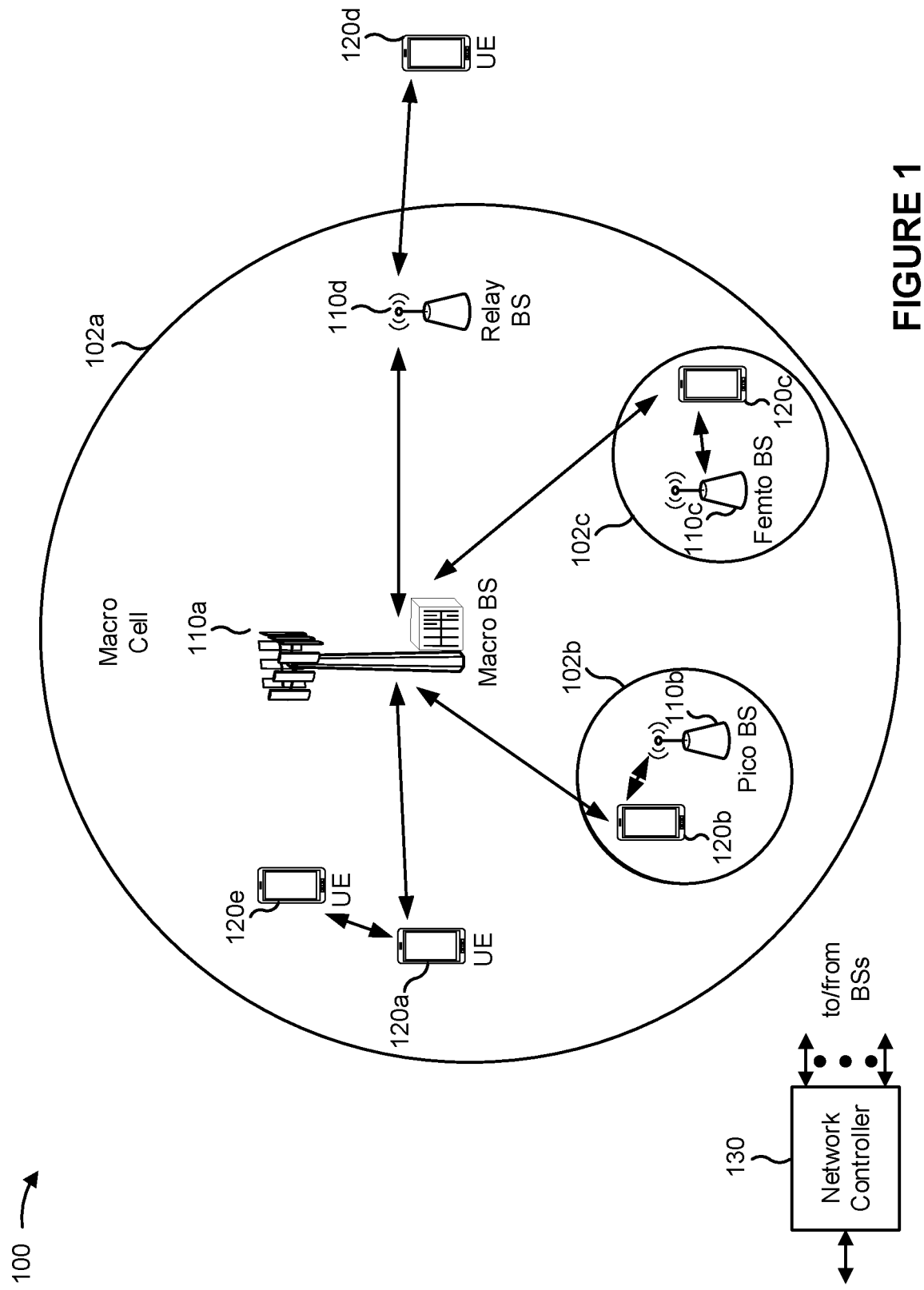
FIG. 1 is a block diagram conceptually illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Some wireless communication frequency ranges may be reserved for unlicensed spectrum. In some unlicensed spectrum deployment implementations, different operators or technologies may use different portions of the unlicensed spectrum concurrently. Multiple operators may deploy, for example NR networks, Wi-Fi networks, or LTE networks, at a single location using the unlicensed spectrum for communication. In such instances, each operator or technology may operate at a common location and use a common set of frequency bands, but remain disassociated from other operators or other technologies. For example, a first BS operated by a first operator may not coordinate with a second BS operated by a second operator. In some other unlicensed spectrum deployment implementations, a single operator may deploy multiple ad-hoc cells without a central entity to coordinate the plurality of the ad-hoc cells. For example, a first BS operated by an operator and a second BS operated by the same operator may lack central coordination via a central entity.

To obtain access to communication resources using unlicensed spectrum, a UE may perform a contention-based access procedure. For example, the UE may perform a listen-before-talk, or listen-before-transmit, (LBT) procedure to obtain access to communication resources. The LBT procedure may be a category type 2 LBT procedure (Cat-2 LBT) for fixed duration sensing or a category 4 LBT procedure (Cat-4 LBT) with a variable duration sensing where the variable duration is based on priority class and a back off period when the UE detects interference. In some cases, the UE may experience an LBT failure when the UE fails to transmit an uplink transmission during an uplink transmission instance. For example, when an interfering node, such as another UE, attempts to access the same communication resources as the UE, the interfering node may transmit transmissions that interfere with uplink transmissions of the UE. When attempting to acquire resources, the UE may perform multiple successive LBT procedures.

Some aspects described herein provide for channel congestion measurements based on LBT failures. For example, a UE may determine an LBT metric based on the LBT failures, such as an absolute quantity of LBT failures, a quantity of LBT failures within a particular measurement period, whether the particular measurement period includes a threshold quantity of LBT failures, a ratio of uplink transmission failures to successful uplink transmissions in connection with an LBT procedure, and other possible types of LBT metrics. In this case, when an LBT metric threshold is satisfied, the UE may trigger a recovery action, such as triggering a radio link failure (RLF)-related action, reporting of the LBT metric to a BS, or a bandwidth part switch.

Particular implementations of the subject matter described in this disclosure can be implemented to realize one or more of the following potential advantages. For example, the UE may avoid preemptively triggering the recovery action when an interfering node causes a relatively large quantity of LBT failures within a relatively short period of time. In this way, the UE may reduce network signaling, relative to performing the recovery action, in a situation where the recovery action is unnecessary as a result of the LBT failures being temporary and localized to the relatively short period of time. Furthermore, by triggering a bandwidth part switch after a threshold LBT metric is satisfied for a particular bandwidth part, the UE may enable switching to another bandwidth part with reduced interference, thereby improving network performance and UE performance.

FIG. 1 is a block diagram conceptually illustrating an example of a wireless network 100. The wireless network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and also may be referred to as a base station, a NR BS, a Node B, a gNB, a 5G node B (NB), an access point, or a transmit receive point (TRP). Each BS may provide communication coverage for a particular geographic area. In 3GPP, the term "cell" can refer to a coverage area of a BS, a BS subsystem serving this coverage area, or a combination thereof, depending on the context in which the term is used.

A BS may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another as well as to one or more other BSs or network nodes (not shown) in the wireless network 100 through various types of backhaul interfaces, such as a direct physical connection, a virtual network, or a combination thereof using any suitable transport network.

Wireless network 100 also may include relay stations. A relay station is an entity that can receive a transmission of data from an upstream station (for example, a BS or a UE) and send a transmission of the data to a downstream station (for example, a UE or a BS). A relay station also may be a UE that can relay transmissions for other UEs. In the example shown in FIG. 1, a relay station 110d may communicate with macro BS 110a and a UE 120d in order to facilitate communication between BS 110a and UE 120d. A relay station also may be referred to as a relay BS, a relay base station, a relay, etc.

Wireless network 100 may be a heterogeneous network that includes BSs of different types, for example, macro BSs, pico BSs, femto BSs, relay BSs, etc. These different types of BSs may have different transmit power levels, different coverage areas, and different impacts on interference in wireless network 100. For example, macro BSs may have a high transmit power level (for example, 5 to 40 Watts) whereas pico BSs, femto BSs, and relay BSs may have lower transmit power levels (for example, 0.1 to 2 Watts).

A network controller 130 may couple to a set of BSs and may provide coordination and control for these BSs. Network controller 130 may communicate with the BSs via a backhaul. The BSs also may communicate with one another, for example, directly or indirectly via a wireless or wireline backhaul.

UEs 120 (for example, 120a, 120b, 120c) may be dispersed throughout wireless network 100, and each UE may be stationary or mobile. A UE also may be referred to as an access terminal, a terminal, a mobile station, a subscriber unit, a station, etc. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). A UE 120 may be included inside a housing that houses components of the UE 120, such as processor components, memory components, similar components, or a combination thereof.

In general, any number of wireless networks may be deployed in a given geographic area. Each wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (for example, one or more other UEs). In this example, the UE is functioning as a scheduling entity, and other UEs utilize resources scheduled by the UE for wireless communication. A UE may function as a scheduling entity in a peer-to-peer (P2P) network, in a mesh network, or another type of network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 120 may perform scheduling operations, resource selection operations, as well as other operations described elsewhere herein as being performed by the base station 110.

Figure 2:
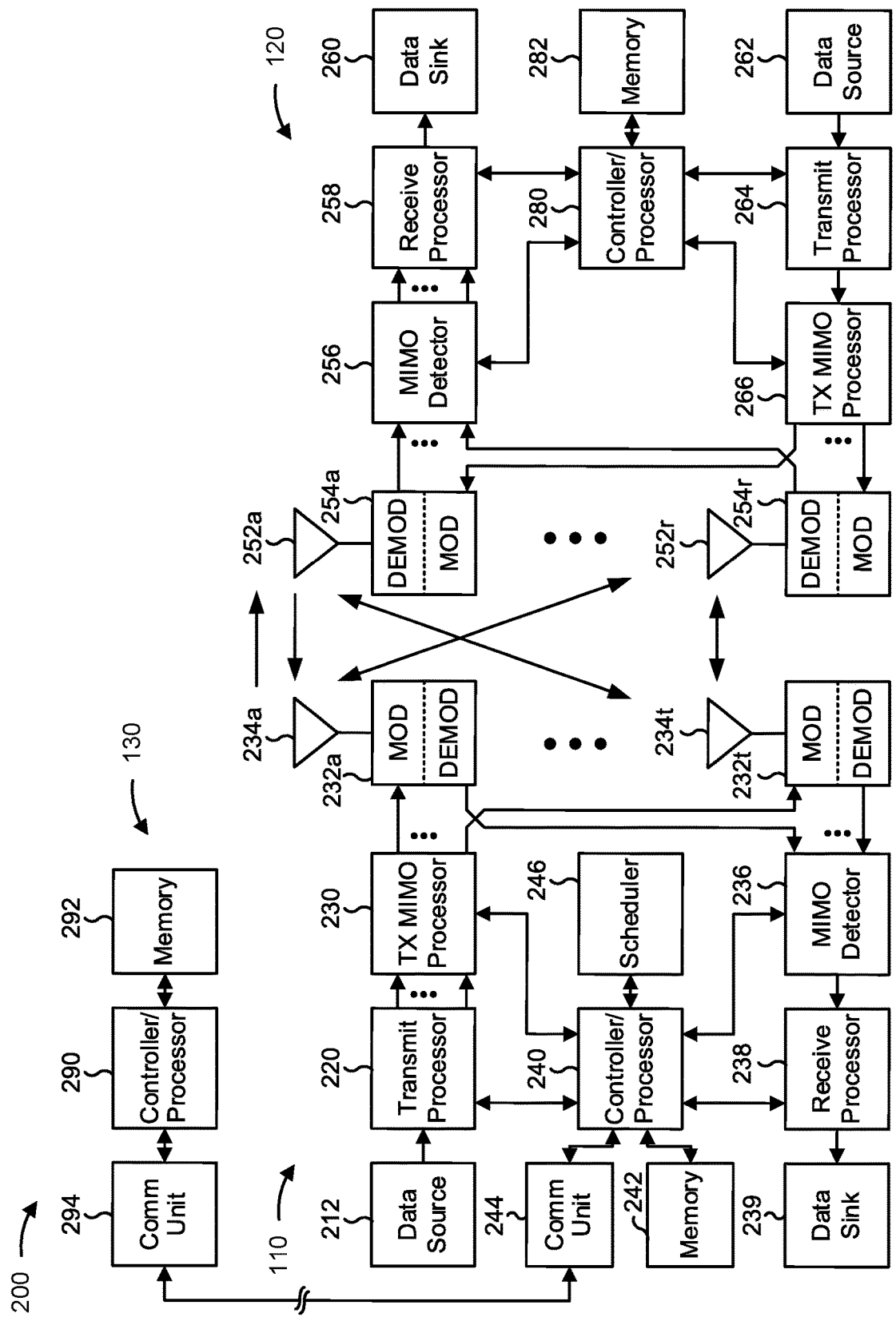
FIG. 2 is a block diagram conceptually illustrating an example of a base station (BS) in communication with a user equipment (UE) in a wireless network.

FIG. 2 is a block diagram conceptually illustrating an example 200 of a base station 110 in communication with a UE 120. In some aspects, the base station 110 and the UE 120 may respectively be one of the base stations and one of the UEs in wireless network 100 of FIG. 1. Base station 110 may be equipped with T antennas 234a through 234t, and the UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based on channel quality indicators (CQIs) received from the UE, process (for example, encode and modulate) the data for each UE based on the MCS(s) selected for the UE, and provide data symbols for all UEs. The transmit processor 220 also may process system information (for example, for semi-static resource partitioning information (SRPI), etc.) and control information (for example, CQI requests, grants, upper layer signaling, etc.) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each modulator 232 may process a respective output symbol stream (for example, for OFDM, etc.) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller or processor (controller/processor) 280. A channel processor may determine reference signal received power (RSRP), received signal strength indicator (RSSI), reference signal received quality (RSRQ), channel quality indicator (CQI), etc. In some aspects, one or more components of the UE 120 may be included in a housing.

On the uplink, at the UE 120, a transmit processor 264 may receive and process data from a data source 262 and control information (for example, for reports including RSRP, RSSI, RSRQ, CQI, etc.) from controller/processor 280. Transmit processor 264 also may generate reference symbols for one or more reference signals. The symbols from transmit processor 264 may be precoded by a TX MIMO processor 266 if applicable, further processed by modulators 254a through 254r (for example, for DFT-s-OFDM, CP-OFDM, etc.), and transmitted to the base station 110. At the base station 110, the uplink signals from the UE 120 and other UEs may be received by antennas 234, processed by demodulators 232, detected by a MIMO detector 236 if applicable, and further processed by a receive processor 238 to obtain decoded data and control information sent by the UE 120. Receive processor 238 may provide the decoded data to a data sink 239 and the decoded control information to a controller or processor (i.e., controller/processor) 240. The base station 110 may include communication unit 244 and communicate to network controller 130 via communication unit 244. The network controller 130 may include communication unit 294, a controller or processor (i.e., controller/processor) 290, and memory 292.

Controller/processor 240 of the base station 110, controller/processor 280 of the UE 120, or any other component(s) of FIG. 2 may perform one or more techniques associated with channel congestion measurement, as described in more detail elsewhere herein. For example, controller/processor 240 of the base station 110, controller/processor 280 of the UE 120, or any other component(s) (or combinations of components) of FIG. 2 may perform or direct operations of, for example, a process 400 of FIG. 4, a process 500 of FIG. 5, or other processes as described herein. Memories 242 and 282 may store data and program codes for the base station 110 and the UE 120, respectively. A scheduler 246 may schedule UEs for data transmission on the downlink, the uplink, or a combination thereof.

In some aspects, the UE 120 may include means for performing a set of listen-before-talk (LBT) procedures to access an unlicensed spectrum, means for determining an LBT metric associated with a result of the set of LBT procedures, means for selectively triggering a recovery procedure based on the LBT metric satisfying an LBT metric threshold, or combinations thereof. In some aspects, such means may include one or more components of the UE 120 described in connection with FIG. 2.

In some aspects, the base station 110 may include means for configuring the second bandwidth part to enable the bandwidth part switch for a user equipment (UE) and in connection with a listen-before-talk (LBT) metric, where the second bandwidth part is different from an initial access bandwidth part or a default bandwidth part, means for receiving a reporting message indicating the trigger of the bandwidth part switch by a UE after the LBT metric satisfies a threshold, or combinations thereof. In some aspects, such means may include one or more components of the base station 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of controller/processor 280.

Figure 3A:
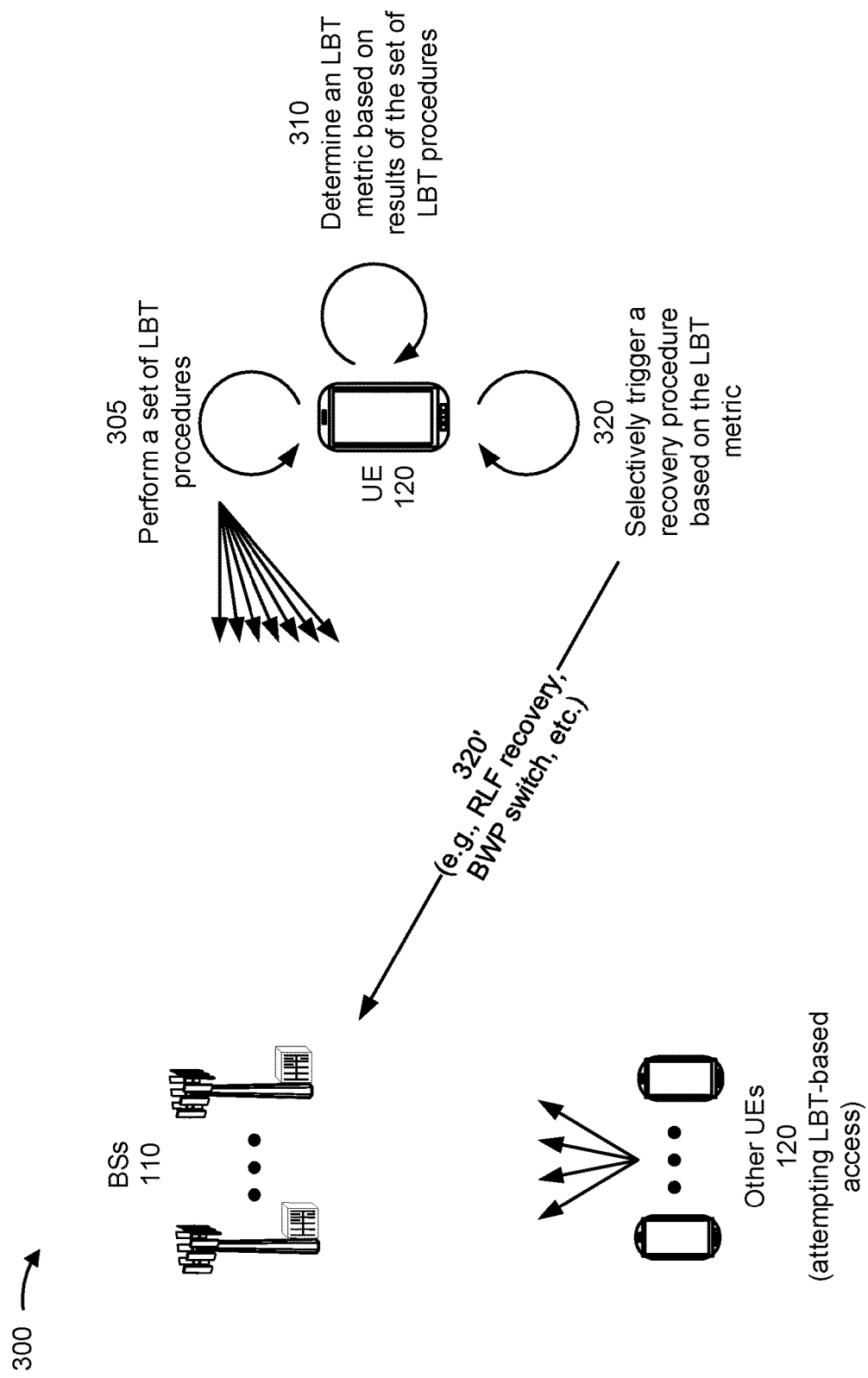
FIGS. 3A-3E are diagrams illustrating examples of channel congestion management.

FIGS. 3A-3E are diagrams illustrating examples 300 of channel congestion measurement. As shown in FIG. 3A, the examples 300 include a UE 120, one or more BSs 110, and one or more other UEs 120.

As shown in FIG. 3A, and by reference number 305, the UE 120 may perform a set of LBT procedures to attempt to access unlicensed spectrum resources of the BSs 110. For example, the UE 120 may perform an LBT procedure within a channel occupancy time (COT) or outside of a COT. In some aspects, the UE 120 may perform the set of LBT procedures using a set of different frequency bands or using a set of different channel types. For example, the UE 120 may perform a first LBT procedure on a first frequency using a physical random access channel (PRACH), a second LBT procedure on a second frequency using a physical uplink control channel (PUCCH), or a third LBT procedure on a third frequency using a physical uplink shared channel (PUSCH).

In some aspects, the UE 120 may perform one or more successful LBT procedures. For example, the UE 120 may successfully transmit an uplink communication associated with the LBT procedure and may classify the LBT procedure as a success. Additionally, or alternatively, the UE 120 may unsuccessfully transmit an uplink communication associated with the LBT procedure and may classify the LBT procedure as a failure. In this case, the UE 120 may unsuccessfully transmit the uplink communication based on, for example, another UE 120 performing an LBT procedure to attempt LBT-based access to unlicensed spectrum resources. In some aspects, the UE 120 may experience a plurality of failures within a threshold period of time. For example, during a burst set of transmissions, the UE 120 may fail each transmission of the burst set based on another UE 120 acquiring a channel on which the UE 120 is attempting to transmit.

As shown in FIG. 3A, and by reference number 310, the UE 120 may determine an LBT metric based on results of the set of LBT procedures. For example, the UE 120 may determine a quantity of LBT failures and increment the LBT metric by the quantity of LBT failures. In this case, the UE 120 may count each instance of an uplink transmission independently for determining an LBT failure. For example, when the UE 120 is not able to transmit on an uplink transmission instance as a result of an LBT failure, the UE 120 may count an LBT failure and increment the LBT metric. In this case, the UE 120 may determine that a transmission is not completed based at least in part on expiration of a failure detection timer, and may increment a counter. In contrast, when the UE 120 is able to transmit on an uplink transmission instance, the UE 120 may count an LBT success. In this case, an uplink transmission instance may include a PUSCH transmission instance, a PUCCH transmission instance, a PRACH transmission instance, or another type of uplink channel transmission instance. For example, when the UE 120 receives an uplink grant scheduling a plurality of PUSCHs, the UE 120 may count an LBT failure for each PUSCH of the plurality of PUSCHs that the UE 120 fails to transmit. In some aspects, the UE 120 may reset a counter of LBT failures. For example, based at least in part on expiration of a failure detection timer (without detection of a failure), reconfiguration of the failure detection timer, or reconfiguration of the counter, UE 120 may reset the counter of LBT failures to an initial value (0).

Figure 3B:
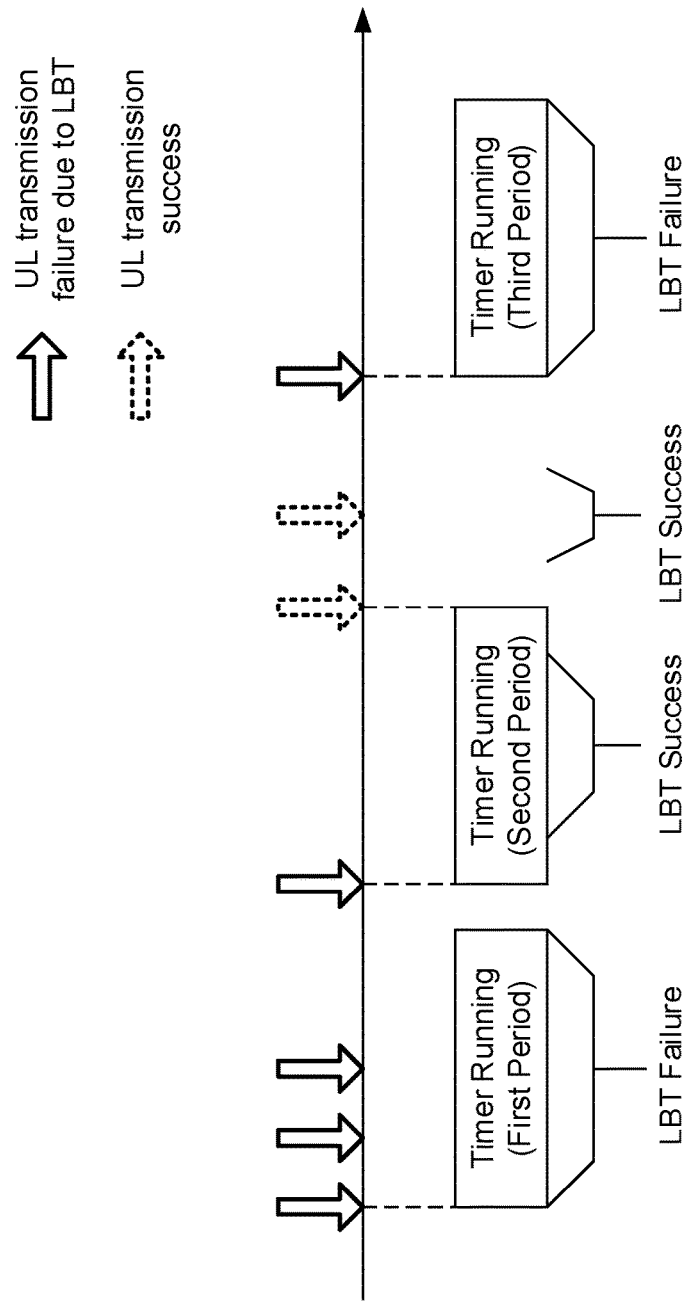

In some aspects, the UE 120 may set a timer, such as a prohibit timer, and may determine the LBT metric based on one or more LBT failures or LBT successes within a period of time tracked by the timer. For example, as shown in FIG. 3B and by reference number 315-1, a timer may track a set of periods during which uplink transmission instances may occur. In this case, when all uplink transmission instances of a particular period, such as the first period and the third period, result in LBT failures, the UE 120 may determine an LBT failure for the particular period and may increment the LBT metric. In contrast, when at least one uplink transmission instance results in an LBT success, as in the second period or in a period of time not being tracked by the timer, the UE 120 may determine an LBT success for the particular period and may not increment the LBT metric.

In some aspects, the UE 120 may start the prohibit timer based on an LBT failure occurring. For example, the UE 120 may start the prohibit timer to determine whether an uplink transmission success occurs within a threshold period of time of an uplink transmission failure. In this case, the UE 120 may stop the prohibit timer after a threshold period of time (and determine that an LBT failure has occurred) or after an uplink transmission success within the threshold period of time (and determine that an LBT success has occurred). In this case, each threshold time period results in the UE 120 determining a single LBT failure or success for an entire time period, rather than a plurality of LBT failures for a plurality of failed uplink transmission instances in the time period.

In some aspects, the UE 120 may increment the LBT metric based on a quantity of uplink failures during a threshold time period associated with the prohibit timer. For example, the UE 120 may increment the LBT metric by a ratio of uplink transmission failures to total uplink transmission attempts during the threshold time period. Additionally, or alternatively, the UE 120 may increment the LBT metric based on whether a quantity of uplink transmission failures satisfies a threshold. For example, rather than determining an LBT failure when all uplink transmission attempts of a particular time period are failures, the UE 120 may determine an LBT failure when a threshold quantity of uplink transmission attempts are failures. As an example, when the threshold quantity is two uplink transmission failures, the UE 120 may determine an LBT failure for the first time period but may not determine an LBT failure for the third time period. Additionally, or alternatively, the UE 120 may stop the prohibit timer and determine an LBT success based on a threshold quantity of successful uplink transmissions occurring during a threshold period of time, and may determine the LBT metric based on a quantity of LBT successes. In some cases, the prohibit timer may be associated with uplink transmission success periods rather than uplink transmission failure periods.

Figure 3C:
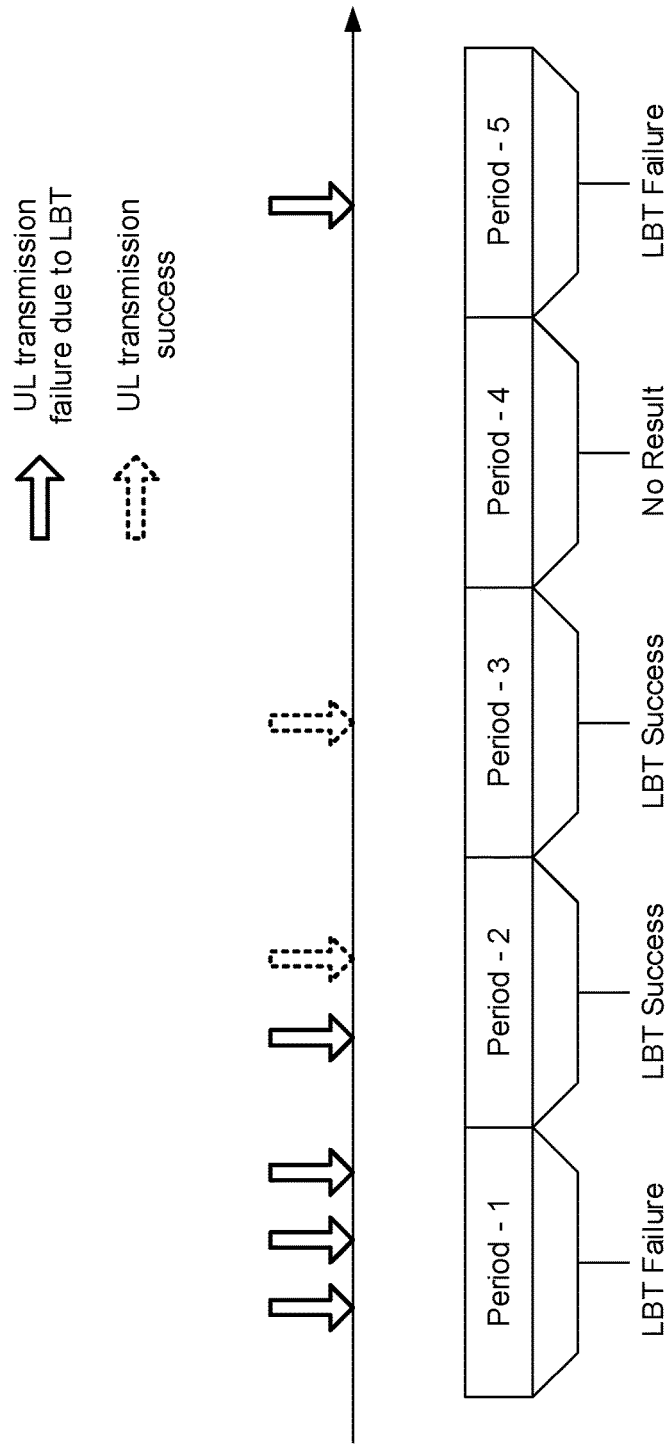

In some aspects, the UE 120 may use a set of evaluation periods to determine whether to increment an LBT metric based on an LBT failure. For example, as shown in FIG. 3C and by reference number 315-2, the UE 120 may divide a period of time into a set of equal-sized evaluation periods and a single LBT result (an LBT failure or an LBT success) may be determined for each evaluation period. In this case, for example, the UE 120 may determine an LBT failure for periods 1 and 5 (in which unsuccessful uplink transmission occurs and no successful uplink transmission occurs), an LBT success for periods 2 and 3 (in which at least one successful uplink transmission occurs), and no result for period 4 (in which neither a successful nor unsuccessful uplink transmission occurs). In some aspects, the evaluation periods may have different sizes or may overlap in time.

Additionally, or alternatively, the UE 120 may increment the LBT metric by a fraction of uplink transmission failures to total uplink transmission attempts for each evaluation period. Additionally, or alternatively, the UE 120 may determine an LBT failure for a particular evaluation period when a quantity of uplink transmission failures satisfies a threshold quantity. Additionally, or alternatively, the UE 120 may determine an LBT success for a particular evaluation period when a quantity of uplink transmission successes satisfies a threshold. In some aspects, the UE 120 may determine the LBT failure or success when a minimum quantity of LBT failures or success is observed. For example, the UE 120 may forgo incrementing an LBT metric when only a single uplink transmission failure occurs in a single uplink transmission instance of an evaluation period.

Figure 3D:
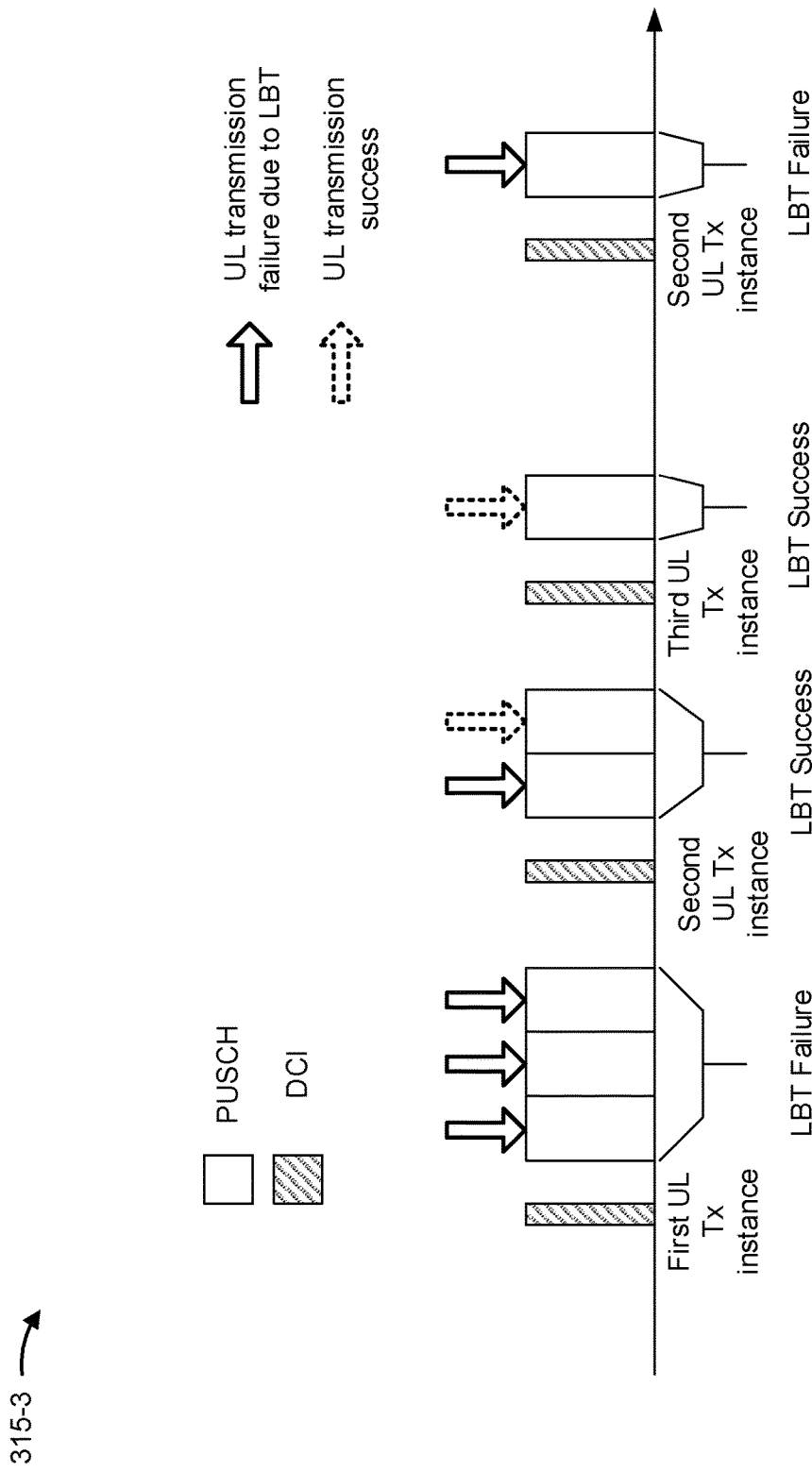

In some aspects, the UE 120 may determine the LBT metric based on a scheduled uplink transmission. For example, as shown in FIG. 3D and by reference number 315-3, the UE 120 may receive a set of downlink control information (DCIs) including information identifying uplink grants, PUSCH transmission instances, or other uplink channel transmissions. In this case, the UE 120 may determine an LBT failure and increment the LBT metric when the UE 120 is unable to successfully perform an uplink transmission during any instance scheduled by the DCI. For example, after the first DCI, the UE 120 may determine an LBT failure and increment an LBT metric based on each uplink transmission attempt being a failure. In contrast, after the second DCI, the UE 120 may determine an LBT success based on at least one uplink transmission being successful. Additionally, or alternatively, the UE 120 may determine the LBT metric based on other determinations in relation to the scheduled uplink transmission, such as based on a ratio of uplink transmission failures to uplink transmission successes or based on a threshold quantity of uplink transmission failures or uplink transmission successes.

Figure 3E:
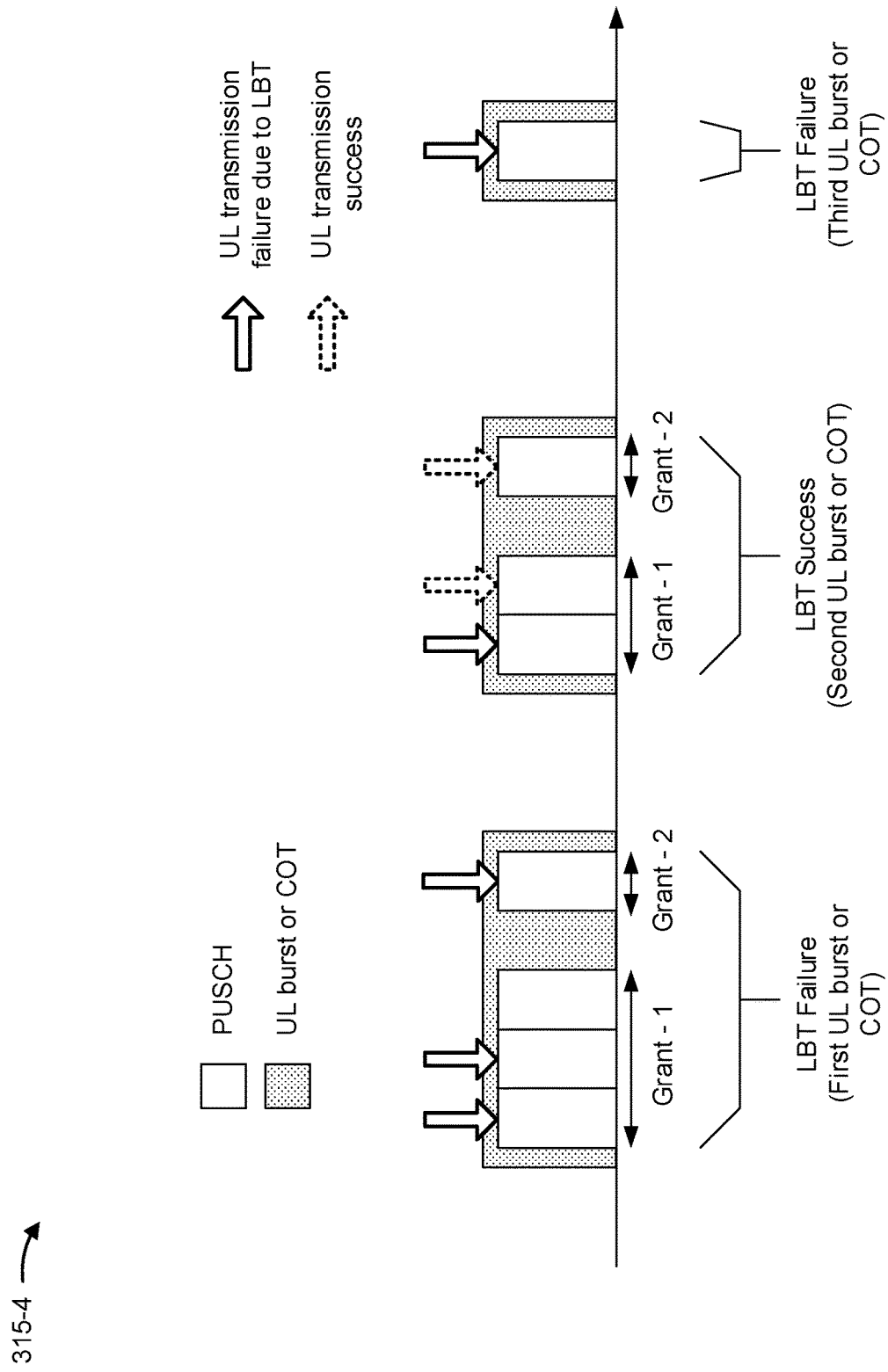

In some aspects, the UE 120 may determine the LBT metric based on an uplink transmission burst set or COT. For example, as shown in FIG. 3E and by reference number 315-4, the UE 120 may attempt to transmit during a plurality of uplink transmission bursts or COTs. In this case, the UE 120 may determine an LBT failure and may increment the LBT metric when each uplink transmission attempt in an uplink transmission burst or COT is a failure. In contrast, the UE 120 may determine an LBT success when at least one uplink transmission attempt in an uplink transmission burst or COT is a success. Additionally, or alternatively, the UE 120 may determine the LBT metric based on other determinations in relation to an uplink burst or COT, such as incrementing the LBT metric by a ratio of uplink transmission failures to uplink transmission successes or determining the LBT metric based on a threshold quantity of uplink transmission failures or uplink transmission successes in an uplink burst or COT.

In some aspects, the UE 120 may determine the LBT metric based on an uplink transmission start point. For example, the UE 120 may determine an LBT success and increment the LBT metric when the UE 120 is able to successfully perform an uplink transmission at any available uplink transmission start point. Additionally, or alternatively, the UE 120 may increment an LBT metric by a ratio of a quantity of start points at which the UE 120 unsuccessfully attempted to perform an uplink transmission to a total quantity of start points. Additionally, or alternatively, the UE 120 may determine an LBT success and increment the LBT metric when a threshold percentage or quantity of start points are associated with unsuccessful uplink transmission attempts. Additionally, or alternatively, rather than on a per-start point basis, the UE 120 may determine the LBT metric on a slot basis, a mini-slot basis, or an uplink grant basis. For example, the UE 120 may determine an LBT success and increment an LBT metric based on using a plurality of start points within a single slot, a plurality of start points within an uplink grant or uplink burst or a COT, a plurality of slots within an uplink grant or an uplink burst or a COT, or a plurality of uplink grants within an uplink burst or a COT.

In some aspects, the UE 120 may determine a plurality of different LBT metrics. For example, the UE 120 may determine a first LBT metric for category 2 LBT (Cat-2 LBT) based uplink transmission attempts and a second LBT metric for category 4 LBT (Cat-4 LBT) based uplink transmission attempts. In some aspects, the UE 120 may determine the first LBT metric for uplink transmission attempts within an acquired COT and the second LBT metric for uplink transmission attempts outside of an acquired COT. Additionally, or alternatively, the UE 120 may determine the first LBT metric for a first sub-band and the second LBT metric for a second sub-band. In this case, the UE 120 may perform Cat-4 LBT on a primary sub-band of the first sub-band and the second sub-band, and Cat-2 LBT on a secondary sub-band of the first sub-band and the second sub-band. Additionally, or alternatively, the UE 120 may perform Cat-4 LBT on both the first sub-band and the second sub-band.

Additionally, or alternatively, the UE 120 may determine the LBT metric based on a UE capability. For example, when a UE capability of the UE 120 enables transmission on a subset of sub-bands, the UE 120 may determine an LBT success when a Cat-4 LBT or Cat-2 LBT is successful on a first subset of sub-bands and unsuccessful on a second subset of sub-bands. In contrast, for a different capability, when the UE 120 is only able to perform uplink transmission when an LBT procedure is successful on each sub-band, the UE 120 may determine an LBT failure if Cat-2 LBT or Cat-4 LBT is unsuccessful on any sub-band. In some aspects, the UE 120 may determine a different LBT metric for each sub-band or a common LBT metric for a plurality of sub-bands.

As shown in FIG. 3A, and by reference number 320, the UE 120 may selectively trigger a recovery procedure based on the LBT metric. For example, as shown by reference number 320', the UE 120 may communicate with the BS 110 to trigger a radio link failure (RLF)-based recovery action, a bandwidth part switch, or another type of recovery action.

In some aspects, the UE 120 may determine to trigger the recovery procedure based on the LBT metric satisfying a threshold. For example, an LBT metric representing a quantity of LBT failures may exceed an absolute threshold, an LBT metric representing a ratio of unsuccessful uplink transmission attempts to uplink transmission opportunities may satisfy a ratio threshold over a threshold period of time, or another type of threshold may be satisfied. In some aspects, the UE 120 may determine that a threshold is satisfied based on one or more of a plurality of LBT metrics. For example, the UE 120 may determine that an equally weighted combination of a Cat-4 LBT metric and a Cat-2 LBT metric exceeds a combined threshold. Additionally, or alternatively, the UE 120 may determine that a Cat-4 LBT metric satisfies a first threshold or a Cat-2 LBT metric satisfies a second threshold. In this case, the UE 120 may report the Cat-4 LBT metric, the Cat-2 LBT metric, or a combination of the Cat-2 LBT metric and the Cat-4 LBT metric when triggering the recovery procedure. Additionally, or alternatively, the UE 120 may determine that a particular sub-band LBT metric satisfies a threshold, and may trigger the recovery procedure.

Additionally, or alternatively, the UE 120 may apply different weights to the Cat-2 LBT metric and the Cat-4 LBT metric when combining the Cat-2 LBT metric and the Cat-4 LBT metric when determining whether a combined threshold is satisfied. For example, the UE 120 may apply weights based on a percentage of time each channel for Cat-2 LBT or Cat-4 LBT is sensed to be busy based on uplink transmission failures, an initial LBT counter value, a congestion window size, or a channel access priority class.

In some aspects, based on determining that an LBT metric is satisfied, the UE 120 may trigger a bandwidth part switch. For example, the UE 120 may switch from a first bandwidth part on which the UE 120 is operating to a second bandwidth part configured by a BS 110, which is a serving cell for the UE 120. In some aspects, the UE 120 may switch to a bandwidth part that is not an initial access bandwidth part or a default bandwidth part. For example, the UE 120 may switch from a relatively narrow bandwidth initial access bandwidth part to a relatively broad bandwidth different bandwidth part. Additionally, or alternatively, the UE 120 may perform a random access channel (RACH) procedure after a bandwidth part switch (and without indicating the bandwidth part switch to the BS 110 at an earlier time).

In some aspects, when uplink resources are configured or granted for the UE 120, the UE 120 may transmit a message to the BS 110 indicating the bandwidth part switch. For example, the UE 120 may transmit a radio resource control (RRC), medium access control (MAC), or physical layer message to indicate the bandwidth part switch. In this case, the UE 120 may include information indicating that the bandwidth part switch is based on the LBT metric satisfying a threshold or information identifying a quantity of LBT failures.

In some aspects, rather than triggering a recovery action, the UE 120 may transmit a message indicating that the LBT metric satisfies a threshold. For example, when the UE 120 determines that the LBT metric is satisfied on a secondary cell rather than on a primary cell, the UE 120 may indicate to the BS 110 that the LBT metric is satisfied and may avoid triggering an RLF-based recovery action. In this case, the UE 120 may indicate that an LBT failure has occurred, may identify the LBT failure metric, may perform a network measurement and provide a measurement report for the secondary cell, or may include other metrics, such as a COT metric or a received signal strength indicator (RSSI).

Figure 4:
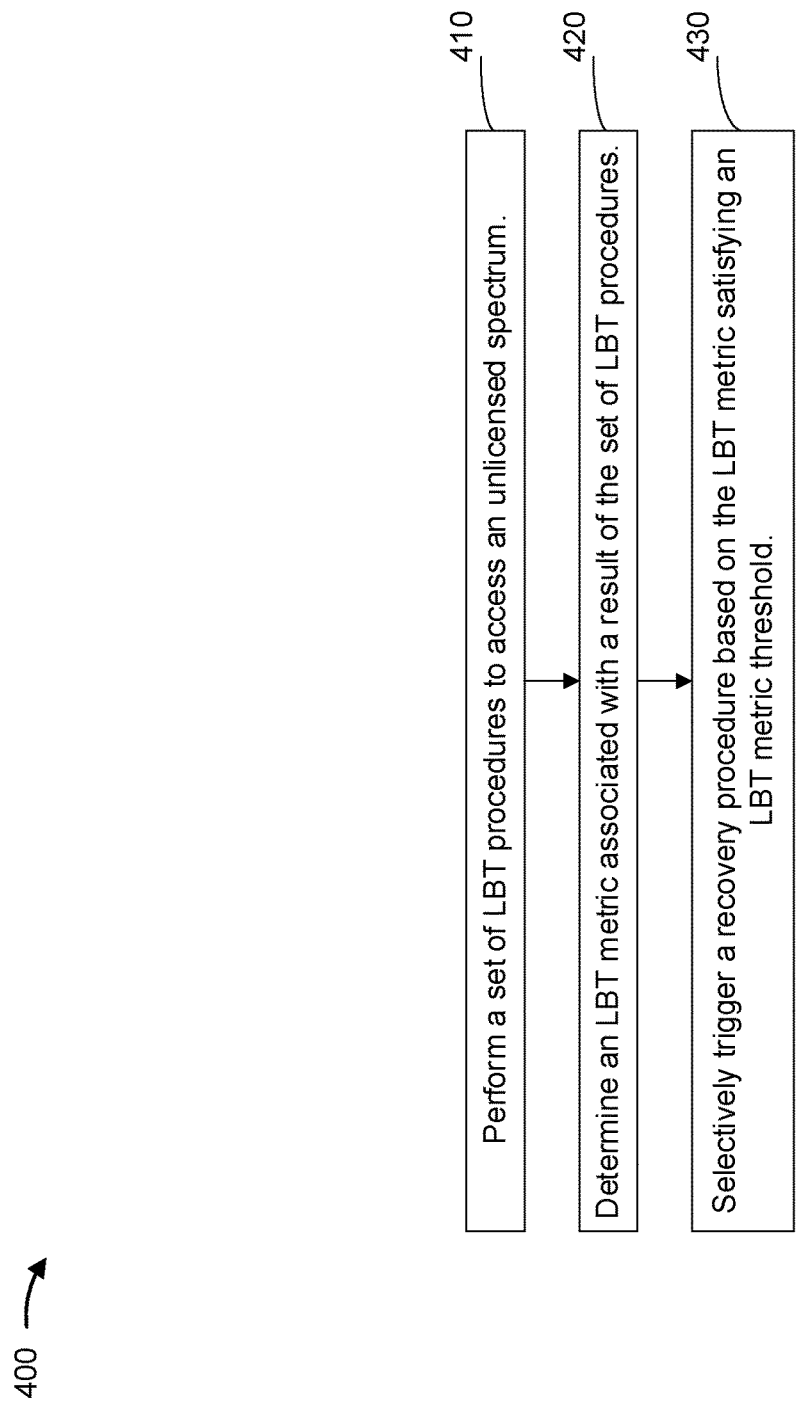
FIG. 4 is a diagram illustrating an example process performed, for example, by a UE.

FIG. 4 is a diagram illustrating an example process 400 performed, for example, by a UE. The example process 400 shows where a UE, such as the UE 120, performs operations associated with channel congestion measurement.

As shown in FIG. 4, in some aspects, the process 400 may include performing a set of LBT procedures to access an unlicensed spectrum (block 410). For example, the UE (using receive processor 258, transmit processor 264, controller/processor 280, or memory 282) may perform a set of LBT procedures to access an unlicensed spectrum. In some aspects, the UE may include an interface to perform the set of LBT procedures.

As shown in FIG. 4, in some aspects, the process 400 may include determining an LBT metric associated with a result of the set of LBT procedures (block 420). For example, the UE (using receive processor 258, transmit processor 264, controller/processor 280, or memory 282) may determine an LBT metric associated with a result of the set of LBT procedures. In some aspects, the UE may include an interface to determine the LBT metric.

As shown in FIG. 4, in some aspects, the process 400 may include selectively triggering a recovery procedure based on the LBT metric satisfying an LBT metric threshold (block 430). For example, the UE (using receive processor 258, transmit processor 264, controller/processor 280, or memory 282) may selectively trigger a recovery procedure based on the LBT metric satisfying an LBT metric threshold. In some aspects, the UE may include an interface to selectively trigger the recovery procedure.

The process 400 may include additional aspects, such as any single aspect or any combination of aspects described below or in connection with one or more other processes described elsewhere herein.

In a first aspect, selectively triggering the recovery procedure includes at least one of triggering one or more a RLF related procedures, performing a recovery action, or reporting the LBT metric to a BS.

In a second aspect, alone or in combination with the first aspect, the LBT metric is an LBT failure metric.

In a third aspect, alone or in combination with one or more of the first and second aspects, determining the LBT metric includes determining that an LBT failure occurs for an LBT procedure of the set of LBT procedures based on a failure to transmit on an uplink transmission instance.

In a fourth aspect, alone or in combination with one or more of the first through third aspects, the uplink transmission instance is at least one of a PUSCH transmission, a PUCCH transmission, or a PRACH transmission, or a SRS transmission.

In a fifth aspect, alone or in combination with one or more of the first through fourth aspects, the LBT metric is incremented for each failure to transmit on an uplink transmission instance.

In a sixth aspect, alone or in combination with one or more of the first through fifth aspects, the LBT metric is incremented based on whether at least one failure to transmit on an uplink transmission instance occurs during a threshold period of time.

In a seventh aspect, alone or in combination with one or more of the first through sixth aspects, the LBT metric is incremented based on a ratio of uplink transmission failures to uplink attempts during a threshold period of time.

In an eighth aspect, alone or in combination with one or more of the first through seventh aspects, the LBT metric is incremented based on a threshold quantity of uplink transmission failures occurring during a threshold period of time.

In a ninth aspect, alone or in combination with one or more of the first through eighth aspects, a threshold period of time associated with identifying an LBT failure associated with the LBT metric is ended and the LBT failure is not determined based on a threshold quantity of successful uplink transmissions occurring during the threshold period of time.

In a tenth aspect, alone or in combination with one or more of the first through ninth aspects, the LBT metric is incremented based on whether at least one uplink transmission failure occurs during an evaluation period that includes a uplink transmission.

In an eleventh aspect, alone or in combination with one or more of the first through tenth aspects, the LBT metric is incremented based on a quantity of uplink transmission failures during the evaluation period.

In a twelfth aspect, alone or in combination with one or more of the first through eleventh aspects, the LBT metric is incremented based on whether a quantity of uplink transmission failures during the evaluation period satisfies an uplink transmission failure threshold.

In a thirteenth aspect, alone or in combination with one or more of the first through twelfth aspects, an LBT failure associated with the LBT metric is not determined when a quantity of successful uplink transmissions satisfies an uplink transmission threshold during the evaluation period.

In a fourteenth aspect, alone or in combination with one or more of the first through thirteenth aspects, the LBT metric is incremented based on an occurrence of a scheduled uplink transmission.

In a fifteenth aspect, alone or in combination with one or more of the first through fourteenth aspects, the scheduled uplink transmission includes at least one uplink transmission instance and is at least one of an uplink grant, a PUCCH, or an uplink channel.

In a sixteenth aspect, alone or in combination with one or more of the first through fifteenth aspects, the LBT metric is incremented based on an uplink transmission failure occurring for each uplink transmission instance of the scheduled uplink transmission.

In a seventeenth aspect, alone or in combination with one or more of the first through sixteenth aspects, the LBT metric is incremented based on whether an uplink transmission failure occurs in an uplink burst or a channel occupancy time.

In an eighteenth aspect, alone or in combination with one or more of the first through seventeenth aspects, the LBT metric is incremented based on the uplink transmission failure occurring for each uplink transmission instance of the uplink burst or the channel occupancy time.

In a nineteenth aspect, alone or in combination with one or more of the first through eighteenth aspects, the LBT metric is at least one of an absolute metric representing at least one LBT failure in a measurement interval, a ratio metric representing a ratio of LBT failures to occasions during which an LBT failure can occur in the measurement interval, an absolute metric representing a threshold quantity of LBT failures occurring in the measurement interval, or an absolute metric representing a quantity of LBT failures occurring in the measurement interval.

In a twentieth aspect, alone or in combination with one or more of the first through nineteenth aspects, the measurement interval is at least one of a set of slots, a set of mini-slots, a set of occasions in a single slot, or a set of uplink grants in a channel occupancy time or uplink burst.

In a twenty first aspect, alone or in combination with one or more of the first through twentieth aspects, the LBT metric is on a per-LBT type basis.

In a twenty second aspect, alone or in combination with one or more of the first through twenty first aspects, the LBT metric includes a first LBT metric for category-4 LBT and a second LBT metric for category-2 LBT.

In a twenty third aspect, alone or in combination with one or more of the first through twenty second aspects, the first LBT metric and the second LBT metric are weighted equally for determining whether the LBT metric satisfies the LBT metric threshold.

In a twenty fourth aspect, alone or in combination with one or more of the first through twenty third aspects, selectively triggering the recovery procedure includes triggering the recovery procedure based on the first LBT metric satisfying a first threshold or the second LBT metric satisfying a second threshold.

In a twenty fifth aspect, alone or in combination with one or more of the first through twenty fourth aspects, a first weight is applied to the first LBT metric and a second weight is applied to the second LBT metric for determining whether the LBT metric satisfies the LBT metric threshold. In some aspects, at least one of the first weight or the second weight is determined based on at least one of a ratio of busy slots of a corresponding channel to a total quantity of slots of the corresponding channel, an initial LBT counter value, a congestion window size, or a channel access priority class.

In a twenty sixth aspect, alone or in combination with one or more of the first through twenty fifth aspects, the LBT metric includes a first LBT metric for outside acquired COT LBT and a second LBT metric for inside acquired COT LBT.

In a twenty seventh aspect, alone or in combination with one or more of the first through twenty sixth aspects, the LBT metric is sub-band-specific or common to a plurality of sub-bands.

In a twenty eighth aspect, alone or in combination with one or more of the first through twenty seventh aspects, the LBT metric is determined based on at least one of an LBT failure on one or more sub-bands, an LBT success on one or more sub-bands, or an LBT failure on a single sub-band.

In a twenty ninth aspect, alone or in combination with one or more of the first through twenty eighth aspects, the LBT metric relates to a secondary cell, and selectively triggering the recovery procedure includes transmitting a report to indicate that the LBT metric satisfies the LBT metric threshold for the secondary cell.

In a thirtieth aspect, alone or in combination with one or more of the first through twenty ninth aspects, the report includes information identifying at least one of the LBT metric, a measurement report for the secondary cell, a COT metric, or a RSSI for the secondary cell.

In a thirty first aspect, alone or in combination with one or more of the first through thirtieth aspects, the LBT metric is at least one of a metric relating to a quantity of LBT failures, a metric relating to a channel busy state as a result of LBT failure, or a metric relating to an amount of data missed as a result of LBT failure.

In a thirty second aspect, alone or in combination with one or more of the first through thirty first aspects, the LBT metric relates to a first bandwidth part. In some aspects, selectively triggering the recovery procedure includes performing a bandwidth part switch from the first bandwidth part to a second bandwidth part.

In a thirty third aspect, alone or in combination with one or more of the first through thirty second aspects, the second bandwidth part is different from an initial access bandwidth part or a default bandwidth part.

In a thirty fourth aspect, alone or in combination with one or more of the first through thirty third aspects, the process 400 may include transmitting, to a serving cell, a reporting message indicating triggering of the bandwidth part switch. In some aspects, the reporting message is at least one of a RRC message, a MAC message, or a physical layer message.

In a thirty fifth aspect, alone or in combination with one or more of the first through thirty fourth aspects, the reporting message includes information identifying at least one of a bandwidth part switch triggering event, or a quantity of LBT failures.

In a thirty sixth aspect, alone or in combination with one or more of the first through thirty fifth aspects, the process 400 may include transmitting, to a serving cell, a reporting message after the bandwidth part switch, and the reporting message may be a RACH message.

Although FIG. 4 shows example blocks of the process 400, in some aspects, the process 400 may include additional blocks, fewer blocks, different blocks, or differently arranged blocks than those depicted in FIG. 4. Additionally, or alternatively, two or more of the blocks of the process 400 may be performed in parallel.

Figure 5:
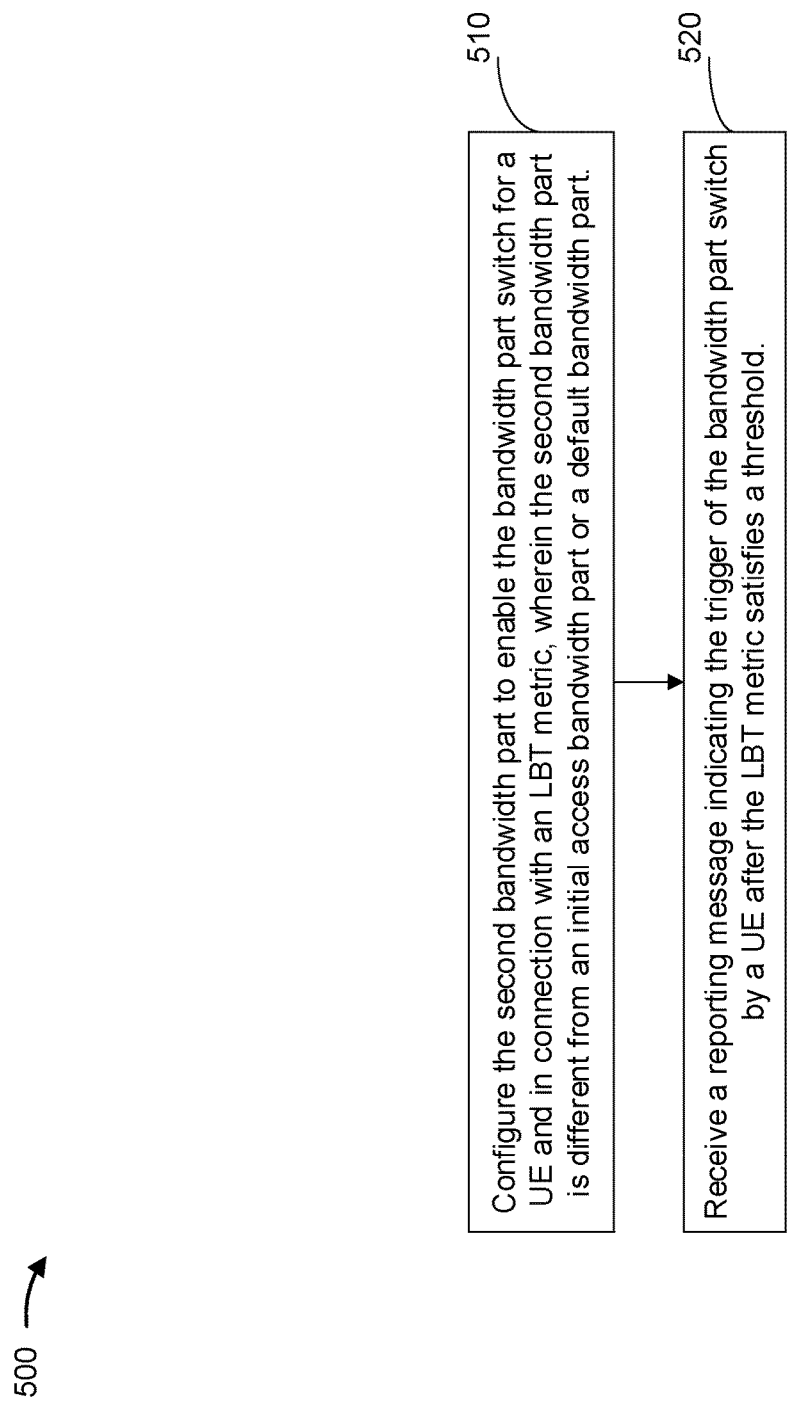
FIG. 5 is a diagram illustrating an example process performed, for example, by a BS.

FIG. 5 is a diagram illustrating an example process 500 performed, for example, by a BS. The example process 500 shows where a BS, such as the BS 110, performs operations associated with channel congestion measurement.

As shown in FIG. 5, in some aspects, the process 500 may include configuring, for a UE on a first bandwidth part, a second bandwidth part to enable a bandwidth part switch for the UE and in connection with an LBT metric, where the second bandwidth part is different from an initial access bandwidth part or a default bandwidth part (block 510). For example, the BS (using transmit processor 220, receive processor 238, controller/processor 240, or memory 242) may configure, for a UE on a first bandwidth part, a second bandwidth part to enable a bandwidth part switch for the UE and in connection with an LBT metric. In some aspects, the second bandwidth part is different from an initial access bandwidth part or a default bandwidth part. In some aspects, the BS may include an interface to configure the second bandwidth part.

As shown in FIG. 5, in some aspects, the process 500 may include receiving a reporting message indicating a trigger of the bandwidth part switch by a UE after the LBT metric satisfies a threshold (block 520). For example, the BS (using transmit processor 220, receive processor 238, controller/processor 240, or memory 242) may receive a reporting message indicating a trigger of the bandwidth part switch by a UE after the LBT metric satisfies a threshold. In some aspects, the BS may include an interface to receive the reporting message.

The process 500 may include additional aspects, such as any single aspect or any combination of aspects described below or in connection with one or more other processes described elsewhere herein.

In a first aspect, the reporting message is at least one of a RRC message, a MAC message, or a physical layer message.

In a second aspect, alone or in combination with the first aspect, the reporting message includes information identifying at least one of a bandwidth part switch triggering event, or a quantity of LBT failures.

In a third aspect, alone or in combination with one or more of the first and second aspects, the process 500 may include receiving a RACH message after the bandwidth part switch.

Although FIG. 5 shows example blocks of the process 500, in some aspects, the process 500 may include additional blocks, fewer blocks, different blocks, or differently arranged blocks than those depicted in FIG. 5. Additionally, or alternatively, two or more of the blocks of the process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

As used herein, satisfying a threshold may, depending on the context, refer to a value being greater than the threshold, greater than or equal to the threshold, less than the threshold, less than or equal to the threshold, equal to the threshold, or not equal to the threshold.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the Figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by an apparatus of a user equipment (UE), comprising:
    performing a set of listen-before-talk (LBT) procedures;
    setting a timer associated with LBT failures;
    determining a quantity of LBT failures, associated with a result of the set of LBT procedures, within a period of time tracked by the timer;
    selectively triggering a recovery procedure based on the quantity of LBT failures satisfying an LBT metric threshold,
        wherein, when the quantity of LBT failures satisfies the LBT metric threshold on a first bandwidth part, selectively triggering the recovery procedure comprises:
            performing a bandwidth part switch from the first bandwidth part to a second bandwidth part, wherein the second bandwidth part is configured by a serving cell for the UE, and
            transmitting, to the serving cell, a medium access control (MAC) message indicating that the LBT metric threshold is satisfied on the first bandwidth part, and
        wherein, when the quantity of LBT failures satisfies the LBT metric threshold on a secondary cell, selectively triggering the recovery procedure comprises:
            transmitting, to the serving cell, a report indicating that the LBT metric threshold is satisfied on the secondary cell; and
    resetting an LBT metric, associated with the quantity of LBT failures, based on at least one of a reconfiguration of the LBT metric or a reconfiguration of the timer.

2. The method of claim 1, wherein the MAC message includes information identifying at least one of:

the LBT metric,
a measurement report,
a channel occupancy time (COT) metric, or
a received signal strength indicator (RSSI).

3. The method of claim 1, wherein the LBT metric is further associated with at least one of:
a metric relating to a channel busy state as a result of LBT failure, or
a metric relating to an amount of data missed as a result of LBT failure.

4. The method of claim 1, wherein the second bandwidth part is different from an initial access bandwidth part or a default bandwidth part.

5. The method of claim 1, further comprising:
performing a random access channel (RACH) procedure after the bandwidth part switch.

6. The method of claim 1, wherein determining the quantity of LBT failures comprises:
determining that an LBT failure occurs for an LBT procedure of the set of LBT procedures based on a failure to transmit on an uplink transmission instance.

7. The method of claim 6, wherein the uplink transmission instance is at least one of:
a physical uplink shared channel (PUSCH) transmission,
a physical uplink control channel (PUCCH) transmission, or
a physical random access channel (PRACH) transmission, or
a sounding reference signal (SRS) transmission.

8. The method of claim 1, wherein the LBT metric is incremented for each failure to transmit on an uplink transmission instance.

9. The method of claim 1, wherein the LBT metric is incremented based on whether at least one failure to transmit on an uplink transmission instance occurs during the period of time.

10. The method of claim 1, wherein the LBT metric is incremented based on a threshold quantity of uplink transmission failures occurring during a threshold period of time.

11. A method of wireless communication performed by an apparatus of a node, wherein the node is a serving cell for a user equipment (UE) on a first bandwidth part,
the method comprising:
configuring a second bandwidth part to enable a bandwidth part switch, from the first bandwidth part to the second bandwidth part, for the UE and in connection with a quantity of listen-before-talk (LBT) failures within a period of time associated with a timer,
wherein the second bandwidth part is different from an initial access bandwidth part or a default bandwidth part; and
selectively:
receiving a medium access control (MAC) message indicating a trigger of the bandwidth part switch by the UE when the quantity of LBT failures satisfies a threshold on the first bandwidth part,
wherein the bandwidth part switch is performed when the quantity of LBT failures satisfies the threshold on the first bandwidth part; and
receiving, when the quantity of LBT failures satisfies the threshold on a secondary cell, a report indicating that the quantity of LBT failures satisfies the threshold on the secondary cell,
wherein an LBT metric, associated with the quantity of LBT failures, is reset based on at least one of a reconfiguration of the LBT metric or a reconfiguration of the timer.

12. The method of claim 11, wherein the MAC message includes information identifying at least one of:
a bandwidth part switch triggering event, or
the quantity of LBT failures.

13. The method of claim 11, wherein a random access channel (RACH) procedure is performed after the bandwidth part switch.

14. A user equipment (UE) for wireless communication, comprising:
a memory; and
one or more processors coupled to the memory, the one or more processors configured to:
perform a set of listen-before-talk (LBT) procedures;
set a timer associated with LBT failures;
determine a quantity of LBT failures, associated with a result of the set of LBT procedures, within a period of time tracked by the timer;
selectively trigger a recovery procedure based on the quantity of LBT failures satisfying an LBT metric threshold,
wherein, when the quantity of LBT failures satisfies the LBT metric threshold on a first bandwidth part, the one or more processors, when selectively triggering the recovery procedure, are configured to:
perform a bandwidth part switch from the first bandwidth part to a second bandwidth part, wherein the second bandwidth part is configured by a serving cell for the UE, and
transmit, to the serving cell, a medium access control (MAC) message indicating that the LBT metric threshold is satisfied on the first bandwidth part, and
wherein, when the quantity of LBT failures satisfies the LBT metric threshold on a secondary cell, the one or more processors, when selectively triggering the recovery procedure, are configured to:
transmit, to the serving cell, a report indicating that the LBT metric threshold is satisfied on the secondary cell; and
reset an LBT metric, associated with the quantity of LBT failures, based on at least one of a reconfiguration of the LBT metric or a reconfiguration of the timer.

15. The UE of claim 14, wherein the MAC message includes information identifying at least one of:
the LBT metric,
a measurement report,
a channel occupancy time (COT) metric, or
a received signal strength indicator (RSSI).

16. The UE of claim 14, wherein the LBT metric is further associated with at least one of:
a metric relating to a channel busy state as a result of LBT failure, or
a metric relating to an amount of data missed as a result of LBT failure.

17. The UE of claim 14, wherein the second bandwidth part is different from an initial access bandwidth part or a default bandwidth part.

18. A node for wireless communication, wherein the node is a serving cell for a user equipment (UE) on a first bandwidth part,
the node comprising:
a memory; and
one or more processors coupled to the memory, the one or more processors configured to:
configure a second bandwidth part to enable a bandwidth part switch, from the first bandwidth part to the second bandwidth part, for the UE and in connection with a quantity of listen-before-talk (LBT) failures within a period of time associated with a timer,
  wherein the second bandwidth part is different from an initial access bandwidth part or a default bandwidth part; and
selectively:
  receive a medium access control (MAC) message indicating a trigger of the bandwidth part switch by the UE when the quantity of LBT failures satisfies a threshold on the first bandwidth part, wherein the bandwidth part switch is performed when the quantity of LBT failures satisfies the threshold on the first bandwidth part; and
  receive, when the quantity of LBT failures satisfies the threshold on a secondary cell, a report indicating that the quantity of LBT failures satisfies the threshold on the secondary cell, wherein an LBT metric, associated with the quantity of LBT failures, is reset based on at least one of a reconfiguration of the LBT metric or a reconfiguration of the timer.

19. The node of claim 18, wherein the MAC message includes information identifying at least one of:
  a bandwidth part switch triggering event, or
  the quantity of LBT failures.

20. The node of claim 18, wherein a random access channel (RACH) procedure is performed after the bandwidth part switch.

21. The method of claim 1, wherein the LBT procedures are performed to access an unlicensed spectrum.

22. The UE of claim 14, wherein the LBT procedures are performed to access an unlicensed spectrum.

23. The UE of claim 14, wherein the LBT metric is an LBT failure metric, and
  wherein the LBT failure metric is incremented for each failure to transmit on an uplink transmission instance that occurs during the period of time.

24. The UE of claim 23, wherein the uplink transmission instance is at least one of:
  a physical uplink shared channel (PUSCH) transmission,
  a physical uplink control channel (PUCCH) transmission, or
  a physical random access channel (PRACH) transmission, or
  a sounding reference signal (SRS) transmission.

25. The UE of claim 14, wherein the LBT metric is incremented based on a threshold quantity of uplink transmission failures occurring during a threshold period of time.

26. The method of claim 1, wherein the LBT metric relates to the secondary cell.

27. The UE of claim 14, wherein the LBT metric relates to the secondary cell.

28. The UE of claim 14, wherein the one or more processors are configured to:
  start the timer based at least in part on an LBT failure occurring.

29. The method of claim 11, wherein the LBT metric is incremented for each failure to transmit on an uplink transmission instance.

30. The node of claim 18, wherein the LBT metric is incremented for each failure to transmit on an uplink transmission instance.

* * * * *